Aug. 16, 1949.　　　　W. H. SEMPE　　　　2,479,421
WHEEL ATTACHMENT FOR TRANSPORTING VEHICLES
Filed Nov. 6, 1944　　　　　　　　　　　　2 Sheets-Sheet 1
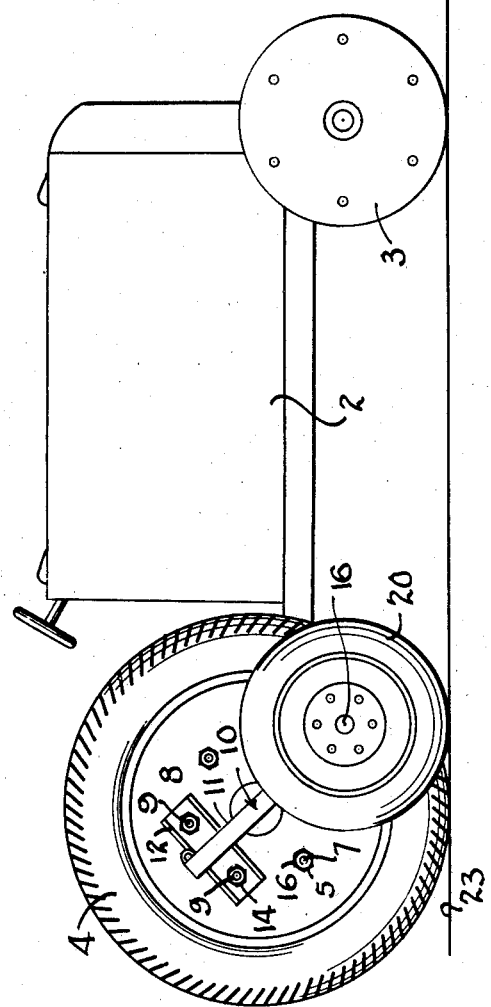
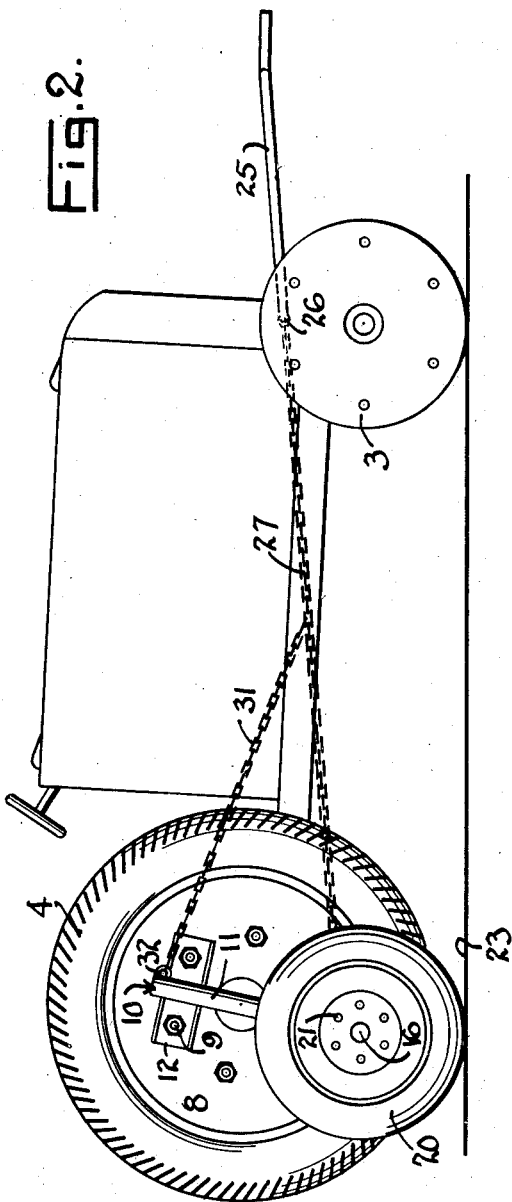
Inventor
WILLIAM H. SEMPE.
By　Lester B Clark.
Attorney Aug. 16, 1949.　　　W. H. SEMPE　　　2,479,421
WHEEL ATTACHMENT FOR TRANSPORTING VEHICLES
Filed Nov. 6, 1944　　　　　　　　　　　　　2 Sheets-Sheet 2

Inventor
WILLIAM H. SEMPE.

By Lester B. Clark.
Attorney

Patented Aug. 16, 1949

2,479,421

UNITED STATES PATENT OFFICE 2,479,421

WHEEL ATTACHMENT FOR TRANSPORTING VEHICLES

William H. Sempe, Fairbanks, Tex.

Application November 6, 1944, Serial No. 562,229

4 Claims. (Cl. 280—150)

The invention relates to an attachment which can be readily applied to say relatively slow moving vehicles whereby the traction wheels thereof may be elevated from contact with the surface being traveled and supported upon a free rolling wheel so that the vehicle then may be towed at a much greater rate of speed than would be possible if the traction wheels were in engagement with the highway.

It is therefore one of the objects of the invention to provide an attachment which elevates the traction wheels of a vehicle.

Another object of the invention is to provide an attachment including a free rolling wheel for the carrying of an object.

Still another object of the invention is to provide an attachment for tractor wheels, whereby the driving wheels will be elevated and the load supported upon a free rolling wheel of the attachment.

Other and further objects of the invention will be readily apparent when the following description is considered in connection with the accompanying drawings wherein—

Fig. 1 is a side elevation of a tractor to which the attachment is being applied.

Fig. 2 is a side elevation of the arrangement of Fig. 1 with the traction wheels of the tractor elevated and the weight supported upon the free rolling wheels of the attachment so that the tractor is ready to be towed.

In Fig. 1 a tractor 2 having the free rolling front wheels 3 and the geared traction or driving wheels 4 has been illustrated. This is merely an example of a vehicle or piece of equipment which is normally arranged for slow movement or might even be illustrative of a piece of equipment which normally might be skidded over the surface. It is contemplated that the invention may be applied to innumerable fields, but it will be here described as applying to a usual type of farm tractor.

The traction wheels 4 in the usual type of tractor are arranged for relatively slow rotation due to the differential and transmission gear ratio, because of the fact that the tractor is intended for relatively slow movement in the farming and pulling operations.

When such a tractor becomes disabled and must be moved to a suitable shop for repair, or is to be moved any considerable distance to another location for use, it is a more or less tedious job to drive it at the rate of one or two miles per hour for any substantial distance on the one hand or to tow it at such a slow rate of speed with some other vehicle. If the tractor is towed at a higher rate of speed, the transmission and differential gear may be damaged and the present invention contemplates a simple and economical attachment for the vehicle so that the traction wheels will be elevated from engagement with the roadway and the tractor is then capable of being towed at a relatively high rate of speed.

Figure 3:
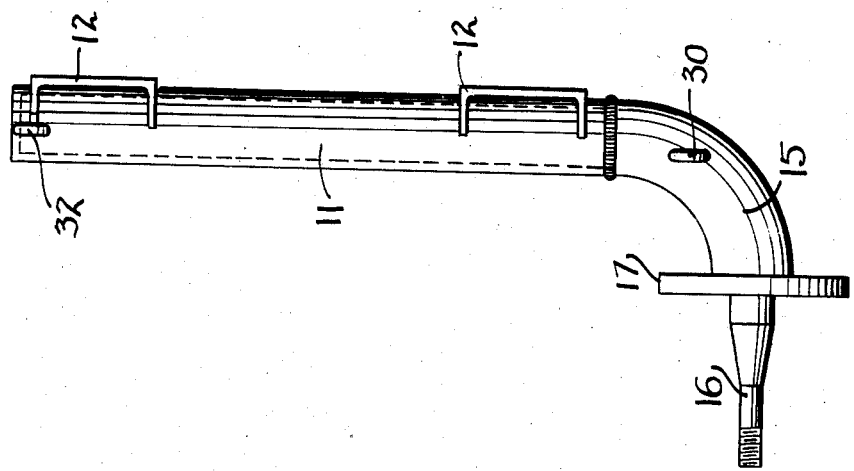
Fig. 3 is a side elevation of the attachment with the free rolling wheel removed.
Figure 4:
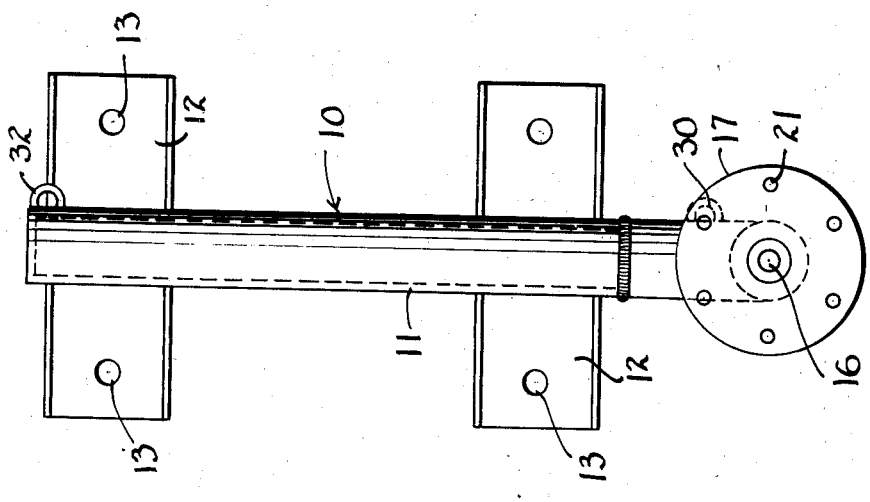
Fig. 4 is front elevation of the attachment as seen in Fig. 3.
Figure 5:
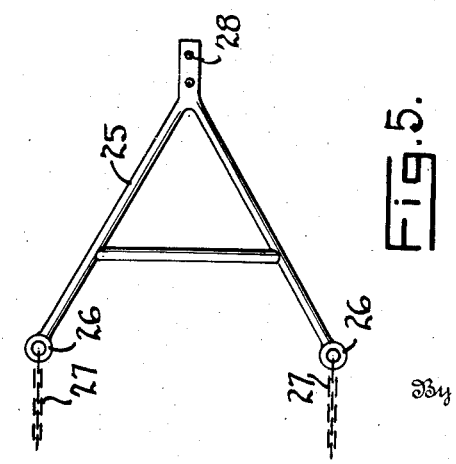
Fig. 5 shows a yoke for attachment to the vehicle to be towed.

The traction wheels 4 are shown as having a plurality of openings 5 therein whereby the bolts 6 and the nuts 7 retain the wheel upon the hub or the disc portion of the wheel 8 which may have suitable openings made therein so as to receive additional bolts 9 for affixing the attachment 10 thereto. The attachement 10 is not permanent, but is used only when it is desired to move the tractor for a distance or to travel or to tow the tractor at a greater speed. The attachment is best seen in Figs. 3 and 4 and may be made up of a pipe, bracket, or other member 11 having the channel or cross pieces 12 affixed thereto in spaced relation. These cross pieces may each have the openings 13 which are arranged to receive the bolts 9 as seen in Fig. 1, so that the attachment may be affixed by threading the nuts 14 on the bolts 9. The attachment has an angular member 15 thereon to which a shaft 16 having a flange at 17 has been affixed in rotatable position similar to an automobile wheel flange. This shaft and flange may be the usual construction of an automobile wheel.

Arranged for attachment on the flange 17 is the free rolling wheel 20 which may be affixed to the flange passing bolts or screws through the openings 21.

In practice, the attachment will be affixed as seen in Fig. 1 while the traction wheel 4 engages the surface 23 which supports the load of the tractor. The attachment will be rigidly affixed by placing the bolts 9 and the nuts 14 to clamp the two cross pieces 12 to the traction wheels. The load of the tractor, however, will not be upon the free rolling wheels 20 at the time of attachment.

After the device has been attached to the traction wheels, a tow yoke such as 25 may be utilized. This yoke is anchored at the forward end of the tractor and has means 28 at the forward end for attachment to a tow vehicle and legs 26 are each arranged to receive an anchor chain or cable 27, one of which may extend along each side of the vehicle and be attached to an eye or anchoring lug 30 adjacent the lower portion of the attachment. A branch anchor chain or member 31 may extend to the other eye or lug 32 on the other end of the attachment so that when the member 27 is drawn taut, the attachment will be held at a slight inclination rearwardly of the axle or shaft of the traction wheels 4 as seen in Fig. 2. It seems obvious that when the traction wheel 4 is rotated that it will carry the bracket 11 and roller 20 around with it and by a proper pull on the tractor itself, the free rolling rollers or wheels 20 will move from the position in Fig. 1 to the position shown in Fig. 2 so that the free rolling wheels will take the load of the tractor and the traction wheels 4 will be elevated from the surface 23 as best seen in Fig. 2. The anchor chains or cables 27 may now be connected or they may have been connected at an earlier step in the proceedings.

In any event the traction wheels are now supported on the free rolling wheels 20 and held against further turning by the anchor means 27, 31 so that the tractor may be moved at will and at any desired speed without injury to the driving mechanism or traction wheels.

What is claimed is:

1. An attachment for relatively slowly rotatable vehicle wheels to raise and carry such wheel comprising a bracket, means to affix the bracket diametrically on the wheel, a stub shaft on said bracket extending laterally of and which is eccentric of the wheel, a roller on said shaft of lesser diameter than said wheel so that the periphery of the roller extends beyond the periphery of the wheel so that as the wheel turns and the roller moves into engagement with the roadway, the roller will cause the wheel to be elevated out of engagement with the roadway and the roller thereafter carries the wheel load, and means to anchor the wheel and bracket against further turning after the roller assumes the load so that the vehicle may be towed at a relatively higher rate of speed than would be possible were the wheel on the roadway.

2. The combination with a vehicle to be towed of an attachment to elevate a wheel of the vehicle comprising a bracket including a pair of spaced cross-plates affixed thereto and attachable to the wheel, a shaft on said bracket, a roller on said shaft disposed eccentrically of the wheel so that as the wheel turns, the roller engages the surface being traveled and further turning of the wheel elevates the wheel, and means to thereafter prevent further rotation of the wheel and bracket so that the vehicle is free to travel on said roller, said last means including a yoke on the vehicle by which it may be connected for towing.

3. A towing attachment for moving vehicles having slowly rotatable wheels comprising a bracket, means to attach the bracket to the wheel, a roller on the bracket to engage the surface being traveled by rotating the wheel to where the roller projects beyond the periphery thereof, said bracket including a pair of cross members to be fitted onto the wheel retaining means.

4. A towing attachment for moving vehicles having slowly rotatable wheels comprising a bracket, means to attach the bracket to the wheel, a roller on the bracket to engage the surface being traveled by rotating the wheel to where the roller projects beyond the periphery thereof, said bracket including a pair of cross members to be fitted onto the wheel retaining means, and means to retain the wheel against further rotation so that the roller carries the load and is free to rotate as the vehicle is towed.

WILLIAM H. SEMPE.

REFERENCES CITED

The following references are of record in the file of this patent:

UNITED STATES PATENTS

| Number | Name | Date |
|---|---|---|
| 337,617 | Rawlings et al. | Mar. 9, 1886 |
| 374,200 | Patton | Dec. 6, 1887 |
| 1,433,486 | Sheronas | Oct. 24, 1922 |
| 1,447,893 | Roy | Mar. 6, 1923 |

FOREIGN PATENTS

| Number | Country | Date |
|---|---|---|
| 484,114 | Germany | Oct. 12, 1929 |
| 496,784 | France | Aug. 14, 1919 |
| 510,534 | Germany | Oct. 20, 1930 |
| 544,888 | France | July 6, 1922 |
| 851,918 | France | Oct. 16, 1939 |